UNITED STATES PATENT OFFICE.

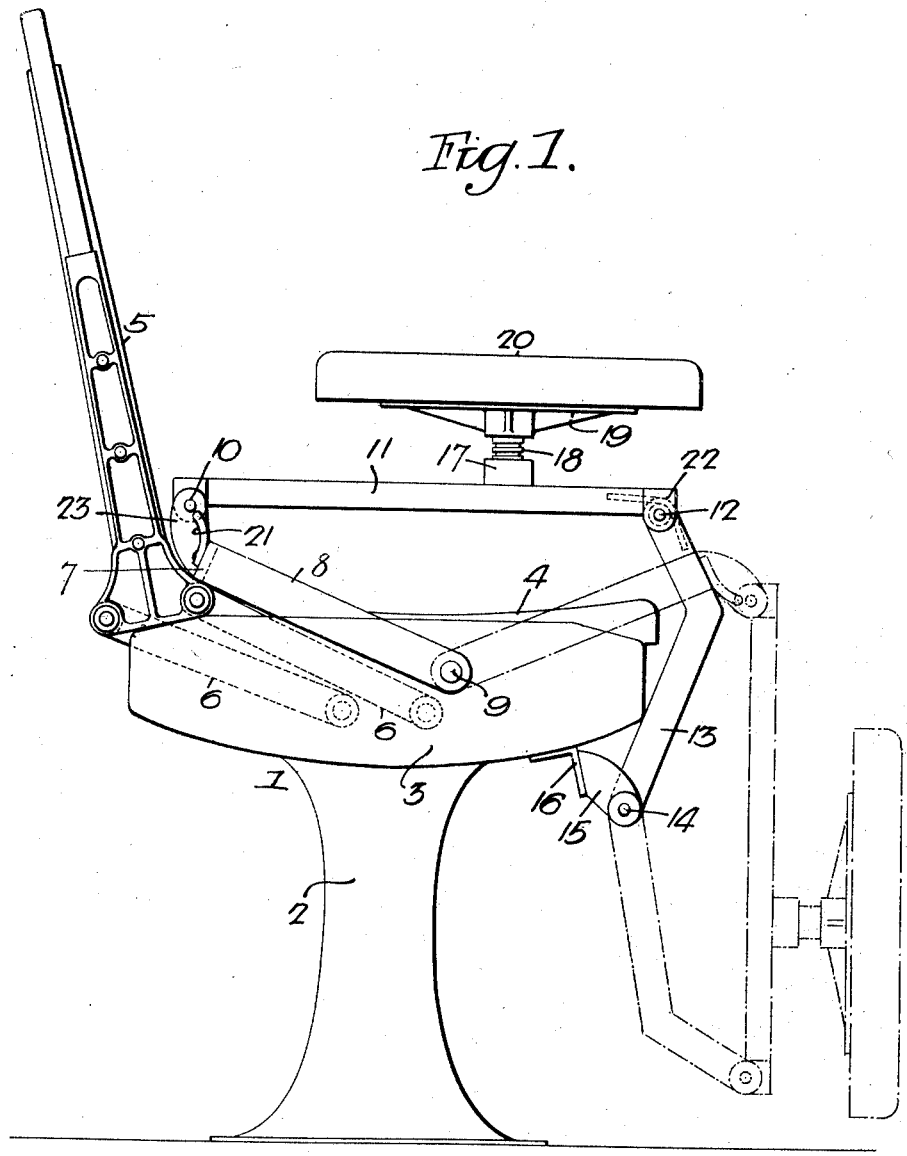

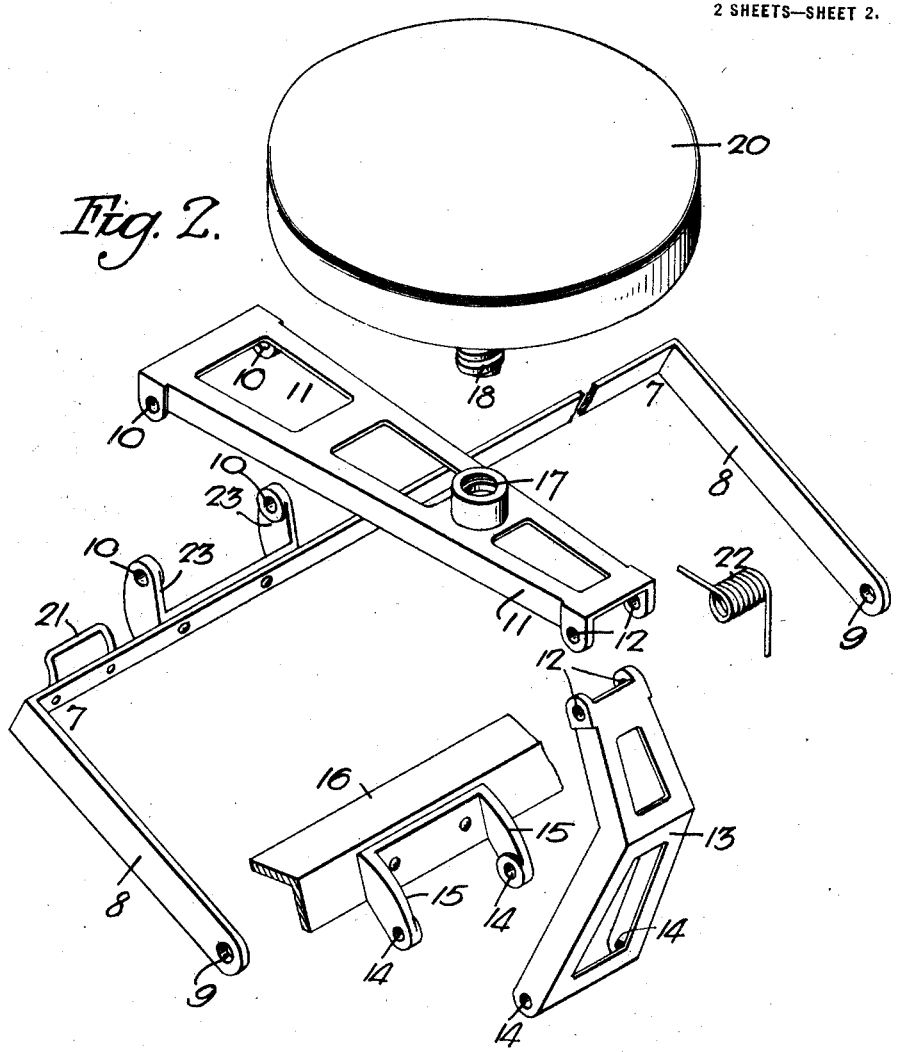

BERNARD SCHECHTER, OF ST. LOUIS, MISSOURI, ASSIGNOR TO AMERICAN CAR COMPANY, OF ST. LOUIS, MISSOURI, A CORPORATION OF MISSOURI.

CAR-SEAT.

1,385,279.         Specification of Letters Patent.         Patented July 19, 1921.

Application filed February 24, 1921. Serial No. 447,501.

*To all whom it may concern:*

Be it known that I, BERNARD SCHECHTER, a citizen of the United States, residing in St. Louis, Missouri, have invented certain Improvements in Car-Seats, of which the following is a specification.

My invention relates to certain improvements in car seats, which are used by motormen in what is known as a "one-man" car. In this type of car, the operating mechanism is located at each end thereof and the motorman occupies a seat which is located above the end seat at either end of the car.

The object of my invention is to provide a motorman's seat of this type, which can be moved into or out of position independently of the movable back of the car seat.

This object I attain in the following manner, reference being had to the accompanying drawings, in which:

Figure 1 is an end view of a car seat, showing my improved motorman's seat in position above the seat section of the car seat; and Fig. 2 is a detached perspective view of details of the mechanism.

1 is the car seat having a pedestal 2 and a frame 3, which carries the seat section 4 of the car seat. 5 is the back of the car seat connected by links 6 to the frame 3 in the ordinary manner so that it can be shifted to either side of the seat section, according to the direction in which the car is moving. 7 is a frame having arms 8, which are pivoted at 9 to each end section 3 of the car seat. Secured to this frame is a bearing 23 having two extensions to which is pivoted at 10 a seat carrying frame 11 pivoted at 12 to a link frame 13 which, in turn, is pivoted at 14 to a bracket 15 secured to an angle bar 16, which is attached to the under side of the frame 3. This angle bar extends from one end of the seat structure to the other, in the present instance.

In the seat carrying frame is a screw threaded opening 17 into which extends the threaded stem 18, which is attached to a seat frame 19 carrying the motorman's seat 20. On turning this seat 20, it can be raised and lowered.

22 is a coiled spring, which is mounted on the pivot pin 12, one end of the spring extending back of the frame 11 and the other back of the link frame 13. This spring tends to stiffen the structure and aids in moving the frames when the seat is shifted from the position shown by dotted lines to that shown by full lines.

At one end of the frame 7 is a handle 21, on grasping which the motorman can shift the entire seat structure from the position shown in full lines in Fig. 1 to the position shown in dotted lines in said figure. The handle is also in position when the parts are located as shown in dotted lines in Fig. 1, so that the motorman can shift the seat from the position illustrated in dotted lines to that illustrated in full lines in said figure.

When the seat structure shown in the drawings is the front seat of the car, then the motorman's seat is moved to the position shown in full lines and the back is in the position illustrated in Fig. 1, but, when the direction of movement of the car is reversed, then the motorman's seat is moved to the position shown by dotted lines in Fig. 1, and the seat back is shifted to the opposite side of the seat structure so that the seat can be occupied by passengers.

By the above construction, it will be seen that the motorman's seat structure is moved independently of the back section of the seat structure.

I claim:

1. The combination of a car seat having a movable back arranged to be shifted to either side of the seat structure; a seat carrying frame; links connecting the seat structure to the frame independently of the back, said carrying frame being arranged to be moved into position, either above the seat section of the car seat, or to one side thereof; and a motorman's seat carried by the seat frame.

2. The combination of a car seat having a back arranged to be moved into position at either side of the car seat; a frame having arms pivoted to the ends of the car seat; a seat carrying frame pivotally attached to the seat frame; a link frame pivotally connecting the opposite end of the seat carrying frame to the under side of the car seat; and a motorman's seat mounted on the seat carrying frame, the parts being so arranged that the seat structure can be moved into and out of position independently of the back of the car seat.

3. The combination of a car seat; a motorman's seat structure consisting of a frame pivoted to the ends of a car seat structure; a link frame, one end of the link frame being pivotally connected to the under side of the seat structure, the seat carrying frame being pivoted to the first mentioned frame and to the link frame; an adjustable seat carried by the seat carrying frame; and a spring located on a pivot connecting the seat carrying frame with the link frame and having arms bearing against the two frames.

BERNARD SCHECHTER.